United States Patent
Nasr et al.

(10) Patent No.: US 7,379,797 B2
(45) Date of Patent: May 27, 2008

(54) SYSTEM AND METHOD FOR BRAKING IN AN ELECTRIC VEHICLE

(75) Inventors: Nader Nasr, Neenah, WI (US); Christopher K. Yakes, Oshkosh, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 184 days.

(21) Appl. No.: 10/950,957

(22) Filed: Sep. 27, 2004

(65) Prior Publication Data

US 2005/0119806 A1    Jun. 2, 2005

Related U.S. Application Data

(60) Continuation-in-part of application No. 10/718,051, filed on Mar. 16, 2004, which is a division of application No. 09/774,981, filed on Jan. 31, 2001, now Pat. No. 6,757,597, application No. 10/950,957, which is a continuation-in-part of application No. 10/326,862, filed on Dec. 19, 2002, now Pat. No. 6,885,920.

(51) Int. Cl.
    B60L 15/00 (2006.01)

(52) U.S. Cl. ............................. 701/22; 180/65.1

(58) Field of Classification Search .......... 701/22; 180/65.1, 65.3, 65.4, 65.5, 65.6, 65.7, 65.8; 290/40 B, 40 C, 40 D
    See application file for complete search history.

(56) References Cited

U.S. PATENT DOCUMENTS

| | | | |
|---|---|---|---|
| 1,951,089 A | 3/1934 | Fielder | |
| 3,524,069 A | 8/1970 | Stepanov et al. | |
| 3,690,559 A | 9/1972 | Rudloff | |
| 3,720,863 A * | 3/1973 | Ringland et al. | ............. 318/52 |
| 3,764,867 A | 10/1973 | Smith | |
| 3,799,284 A | 3/1974 | Hender | |
| 3,865,209 A | 2/1975 | Aihara et al. | |
| 3,966,067 A | 6/1976 | Reese | |
| 4,088,934 A | 5/1978 | D'Atre et al. | |

(Continued)

FOREIGN PATENT DOCUMENTS

DE    1 816 183    6/1970

(Continued)

OTHER PUBLICATIONS

"European Search Report," European Search Patent Application No. 02001052.6 entitled "A/C Bus Assembly for Electronic Traction Vehicle," Aug. 21, 2003 (4 pages).

(Continued)

Primary Examiner—Dalena Tran
(74) Attorney, Agent, or Firm—Foley & Lardner LLP

(57) ABSTRACT

An electric traction system for an electric vehicle includes an internal combustion engine and a generator coupled to the engine, a power bus coupled to the generator, a power storage unit coupled to the power bus, a drive controller coupled to an electric motor and to the power bus, and a vehicle controller coupled to the drive controller. The generator is configured to receive electrical power regenerated onto the power bus by the electric motor in order to provide mechanical power to the engine, and the engine is configured to dissipate the mechanical power in order to provide a braking function.

30 Claims, 3 Drawing Sheets

U.S. PATENT DOCUMENTS

| | | | |
|---|---|---|---|
| 4,097,925 A | 6/1978 | Butler, Jr. | |
| 4,113,045 A | 9/1978 | Downing, Jr. | |
| 4,292,531 A | 9/1981 | Williamson | |
| 4,319,140 A | 3/1982 | Paschke | |
| 4,336,418 A | 6/1982 | Hoag | |
| 4,423,362 A | 12/1983 | Konrad et al. | |
| 4,423,794 A | 1/1984 | Beck | |
| 4,461,988 A | 7/1984 | Plunkett | |
| 4,533,011 A | 8/1985 | Heidemeyer et al. | |
| 4,562,894 A | 1/1986 | Yang | |
| 4,719,361 A | 1/1988 | Brubaker | |
| 4,774,399 A | 9/1988 | Fujita et al. | |
| 4,774,811 A | 10/1988 | Kawamura | |
| 4,953,646 A | 9/1990 | Kim | |
| 4,966,242 A | 10/1990 | Baillargeon | |
| 4,985,845 A | 1/1991 | Gotz et al. | |
| 5,067,932 A | 11/1991 | Edwards | |
| 5,081,832 A | 1/1992 | Mowill | |
| 5,120,282 A | 6/1992 | Fjallstrom | |
| 5,168,946 A | 12/1992 | Dorgan | |
| 5,180,456 A | 1/1993 | Schultz et al. | |
| 5,195,600 A | 3/1993 | Dorgan | |
| 5,201,629 A | 4/1993 | Simpson et al. | |
| 5,202,830 A | 4/1993 | Tsurumiya et al. | |
| 5,227,703 A | 7/1993 | Boothe et al. | |
| 5,241,817 A * | 9/1993 | George, Jr. | 60/39.182 |
| 5,263,524 A | 11/1993 | Boardman | |
| 5,264,763 A | 11/1993 | Avitan | |
| 5,289,093 A | 2/1994 | Jobard | |
| 5,291,960 A | 3/1994 | Brandenburg et al. | |
| 5,343,971 A | 9/1994 | Heidelberg et al. | |
| 5,345,154 A | 9/1994 | King | |
| 5,369,540 A | 11/1994 | Konrad et al. | |
| 5,402,046 A * | 3/1995 | Jeanneret | 318/139 |
| 5,409,425 A | 4/1995 | Shibahata | |
| 5,418,437 A * | 5/1995 | Couture et al. | 318/139 |
| 5,448,561 A | 9/1995 | Kaiser et al. | |
| 5,508,594 A | 4/1996 | Underwood et al. | |
| 5,516,379 A | 5/1996 | Schultz | |
| 5,538,274 A | 7/1996 | Schmitz et al. | |
| 5,558,588 A | 9/1996 | Schmidt | |
| 5,558,589 A | 9/1996 | Schmidt | |
| 5,558,595 A | 9/1996 | Schmidt | |
| 5,568,023 A * | 10/1996 | Grayer et al. | 318/139 |
| 5,575,730 A | 11/1996 | Edwards et al. | |
| 5,575,737 A | 11/1996 | Weiss | |
| 5,586,613 A | 12/1996 | Ehsani | |
| 5,589,743 A | 12/1996 | King | |
| 5,629,567 A | 5/1997 | Kumar | |
| 5,629,603 A | 5/1997 | Kinoshita | |
| 5,646,510 A | 7/1997 | Kumar | |
| 5,669,470 A | 9/1997 | Ross | |
| 5,672,920 A | 9/1997 | Donegan et al. | |
| 5,679,085 A | 10/1997 | Fredriksen et al. | |
| 5,767,584 A | 6/1998 | Gore et al. | |
| 5,788,597 A * | 8/1998 | Boll et al. | 477/4 |
| 5,813,487 A | 9/1998 | Lee et al. | |
| 5,813,488 A | 9/1998 | Weiss | |
| 5,820,150 A | 10/1998 | Archer et al. | |
| 5,828,554 A | 10/1998 | Donegan et al. | |
| 5,847,520 A | 12/1998 | Theurillat et al. | |
| 5,856,976 A | 1/1999 | Hirano | |
| 5,879,265 A | 3/1999 | Bek | |
| 5,880,570 A | 3/1999 | Tamaki et al. | |
| 5,881,559 A | 3/1999 | Kawamura | |
| 5,924,879 A | 7/1999 | Kameyama | |
| 5,925,993 A | 7/1999 | Lansberry | |
| 5,939,794 A | 8/1999 | Sakai et al. | |
| 5,947,855 A | 9/1999 | Weiss | |
| 5,973,463 A | 10/1999 | Okuda et al. | |
| 5,986,416 A | 11/1999 | Dubois | |
| 5,998,880 A | 12/1999 | Kumar | |
| 6,005,358 A | 12/1999 | Radev | |
| 6,028,403 A | 2/2000 | Fukatsu | |
| 6,033,041 A | 3/2000 | Koga et al. | |
| 6,054,844 A | 4/2000 | Frank | |
| 6,065,565 A | 5/2000 | Puszkiewicz et al. | |
| 6,070,538 A | 6/2000 | Flamme et al. | |
| 6,104,148 A | 8/2000 | Kumar et al. | |
| 6,105,984 A | 8/2000 | Schmitz et al. | |
| 6,141,610 A | 10/2000 | Rothert et al. | |
| 6,230,496 B1 | 5/2001 | Hofmann et al. | |
| 6,263,269 B1 | 7/2001 | Dannenberg | |
| 6,298,932 B1 | 10/2001 | Bowman et al. | |
| 6,331,365 B1 * | 12/2001 | King | 429/9 |
| 6,387,007 B1 | 5/2002 | Flni, Jr. | |
| 6,405,114 B1 | 6/2002 | Priestley et al. | |
| 6,421,593 B1 | 7/2002 | Kempen et al. | |
| 6,430,164 B1 | 8/2002 | Jones et al. | |
| 6,522,955 B1 | 2/2003 | Colborn | |
| 6,553,290 B1 | 4/2003 | Pillar | |
| 6,611,116 B2 | 8/2003 | Bachman et al. | |
| 6,722,458 B2 | 4/2004 | Hofbauer | |
| 6,757,597 B2 | 6/2004 | Yakes et al. | |
| 6,882,917 B2 | 4/2005 | Pillar et al. | |
| 6,885,920 B2 | 4/2005 | Yakes et al. | |
| 6,922,615 B2 | 7/2005 | Pillar et al. | |
| 6,993,421 B2 | 1/2006 | Pillar et al. | |
| 2002/0005304 A1 | 1/2002 | Bachman et al. | |
| 2002/0045507 A1 | 4/2002 | Bowen | |
| 2002/0065594 A1 | 5/2002 | Squires et al. | |
| 2003/0130765 A1 | 7/2003 | Pillar et al. | |
| 2003/0158635 A1 | 8/2003 | Pillar et al. | |
| 2003/0158638 A1 | 8/2003 | Yakes et al. | |
| 2003/0158640 A1 | 8/2003 | Pillar et al. | |
| 2003/0163228 A1 | 8/2003 | Pillar et al. | |
| 2003/0163229 A1 | 8/2003 | Pillar et al. | |
| 2003/0163230 A1 | 8/2003 | Pillar et al. | |
| 2003/0171854 A1 | 9/2003 | Pillar et al. | |
| 2003/0195680 A1 | 10/2003 | Pillar | |
| 2003/0200015 A1 | 10/2003 | Pillar | |
| 2003/0205422 A1 | 11/2003 | Morrow et al. | |
| 2003/0230443 A1 | 12/2003 | Cramer et al. | |
| 2004/0002794 A1 | 1/2004 | Pillar et al. | |
| 2004/0019414 A1 | 1/2004 | Pillar et al. | |
| 2004/0024502 A1 | 2/2004 | Squires et al. | |
| 2004/0039510 A1 | 2/2004 | Archer et al. | |
| 2004/0055802 A1 | 3/2004 | Pillar et al. | |
| 2004/0069865 A1 | 4/2004 | Rowe et al. | |
| 2004/0133319 A1 | 7/2004 | Pillar et al. | |
| 2004/0133332 A1 | 7/2004 | Yakes et al. | |
| 2004/0199302 A1 | 10/2004 | Pillar et al. | |
| 2005/0004733 A1 | 1/2005 | Pillar et al. | |
| 2005/0038934 A1 | 2/2005 | Gotze et al. | |
| 2005/0060246 A1 | 3/2005 | Lastinger et al. | |
| 2005/0113988 A1 | 5/2005 | Nasr et al. | |
| 2005/0113996 A1 | 5/2005 | Pillar et al. | |
| 2005/0114007 A1 | 5/2005 | Pillar et al. | |
| 2005/0131600 A1 | 6/2005 | Quigley et al. | |

FOREIGN PATENT DOCUMENTS

| | | |
|---|---|---|
| DE | 41 08 647 A1 | 9/1992 |
| DE | 44 31 929 C1 | 10/1995 |
| DE | 197 49 074 A1 | 5/1999 |
| EP | 0 805 059 B1 | 5/1997 |
| EP | 0 812 720 B1 | 12/1997 |
| EP | 0 622 264 B1 | 11/1998 |
| EP | 0 898 213 A1 | 9/1999 |
| EP | 1 018 451 A1 | 7/2000 |
| EP | 1 092 406 A2 | 4/2001 |
| FR | 2 658 259 A1 | 8/1991 |
| GB | 1 308 318 | 2/1973 |
| GB | 2 302 850 A | 5/1997 |

| | | |
|---|---|---|
| JP | 60-216703 A | 10/1985 |
| WO | WO 98/19875 A1 | 5/1998 |
| WO | WO 01/54939 A2 | 8/2001 |
| WO | WO 03/055714 A1 | 7/2003 |
| WO | WO 03/093046 A2 | 11/2003 |
| WO | WO 03/093046 A3 | 11/2003 |

OTHER PUBLICATIONS

Bose, BK. et al.; *"High Frequency AC vs. DC Distribution System for Next Generation Hybrid Electric Vehicle"*; Industrial Electronics, Control and Instrumentation, 1996; Proceedings of the 1996 IEEE IECON 22nd International Conference on Taipei, Taiwan; Aug. 5-10, 1996, New York, NY; pp. 706-712.

Khan, I. A., "Automotive Electrical Systems: Architecture and Components"; Digital Avionics Systems Conference, 1999; IEEE, pp. 8.C.5-1-8..C.5-10.

Namuduri, CS. et al.; "High Power Density Electric Drive for an Hybrid Electric Vehicle"; Applied Power Electronics Conference and Exposition, 1998. APEC '98. Conference Proceedings 1998, 13th Annual; Anaheim, CA, Feb. 15-19, 1998; New York, New York, IEEE; Feb. 15, 1998, pp. 34-40; ISBN: 0-7803-4340-9/98.

Rajashekara, K.; "History of Electric Vehicles in General Motors"; Industry Applications Society Annual Meeting, 1993; Conference Record of the 1993 IEEE Toronto, Ontario, Canada; Oct. 2-8, 1993; ISBN: O-7803-1462-X; pp. 447-454.

International Search Report for Application No. PCT/US2005/034802, mailing date Jan. 2, 2006, 10 pages.

\* cited by examiner

SYSTEM AND METHOD FOR BRAKING IN AN ELECTRIC VEHICLE

CROSS-REFERENCE TO RELATED PATENT APPLICATIONS

This application is a Continuation in part of U.S. application Ser. No. 10/718,051, filed on Mar. 16, 2004, which is a Divisional of U.S. application Ser. No. 09/774,981, filed on Jan. 31, 2001, now U.S. Pat. No. 6,757,597, both of which are hereby incorporated by reference. This application is also a Continuation-in-part of U.S. application Ser. No. 10/326,862, filed on Dec. 19, 2002 now U.S. Pat. No. 6,885,920, which is also hereby incorporated by reference.

FIELD

The present invention relates generally to the field of electric vehicles and more specifically to systems and methods for providing braking capability in electric vehicles.

BACKGROUND

An electric traction vehicle is a vehicle that uses electricity in some form or another to provide all or part of the propulsion of the vehicle. This electricity can come from a variety of sources, such as stored energy devices relying on chemical conversions (batteries) to create electrical energy, stored energy devices relying on stored electrical charge (capacitors), stored energy devices relying on mechanical stored energy (e.g., flywheels, pressure accumulators), and energy conversion products. In a typical conventional electric traction vehicle, a prime mover, such as a diesel engine, is used to drive an electric generator or alternator which supplies electric current to one or more traction motors. The traction motors typically are coupled to wheel sets on the vehicle. A typical vehicle that utilizes this type of electric traction is a railroad locomotive. In some conventional electric traction vehicles, stored energy is used to provide the main power which provides the electrical current to one or a plurality of traction motors. A typical vehicle that utilizes this type of electric traction is a golf cart or battery powered electric car. In some conventional electric traction vehicles, having more than one source of energy is desirable, such as a stored energy unit and an internal combustion engine coupled to a generator. By having more than one source of energy, some optimizations in the design can allow for more efficient power production, thus allowing power to be used from different sources to come up with a more efficient system for traction. These types of vehicles are commonly referred to as hybrid electric vehicles (HEV). Series and Parallel HEV system designs are what is usually encountered.

In a typical electric vehicle, regenerative braking capability may be provided in addition to or instead of a mechanical braking system by configuring the electric traction motors to function as generators rather than motors, such that the flow of electrical power to the electric traction motors is reversed. In this regeneration mode, each of the electrical traction motors receives mechanical energy from the rotation of the wheel set coupled to the traction motor and operates as a generator to convert the mechanical energy to electrical energy and provide an electrical power output. This process of receiving mechanical energy from the wheels to operate the electrical traction motor as a generator absorbs mechanical energy and acts to reduce the speed of the vehicle. Additionally required braking force is typically provided by a mechanical brake.

The reverse flow of electrical power from the electrical traction motors is typically diverted to the stored energy device. If the diverted electrical power exceeds the capacity of the stored energy device, the excess electrical energy is typically diverted to an energy dissipation device or dynamic brake, such as a resistive element, and is dissipated as heat through the resistive element. Storing and dissipating excess electrical energy in this manner over a large number of braking cycles may decrease the useful life of the stored energy device, and the use of an additional energy dissipation system adds cost and complexity to the system depending on the required size. Further, high costs may be associated with using and maintaining a mechanical braking system, particularly on heavy-duty electric vehicles, such as fire trucks, military vehicles, refuse-handling vehicles, etc. Thus, there is need for a system and method for braking in an electric vehicle which utilizes an engine and generator combination to configured to provide additional braking capability and to dissipate excess energy during regenerative braking.

SUMMARY

According to an exemplary embodiment, an electric traction system for an electric vehicle includes an internal combustion engine and a generator coupled to the engine, a power bus coupled to the generator, a power storage unit coupled to the power bus, a drive controller coupled to an electric motor and to the power bus, and a vehicle controller coupled to the drive controller. The generator is configured to receive electrical power regenerated onto the power bus by the electric motor in order to provide mechanical power to the engine, and the engine is configured to dissipate the mechanical power in order to provide a braking function.

According to another exemplary-embodiment, a method of providing braking in an electric vehicle includes providing an internal combustion engine and a generator coupled to the engine, providing a power bus coupled to the generator, providing a power storage unit coupled to the power bus, providing a drive controller coupled to an electric motor and to the power bus, and providing a vehicle controller coupled to the drive controller. The method also includes configuring the generator to receive electrical power regenerated onto the power bus by the electric motor in order to provide mechanical power to the engine, and configuring the engine to dissipate the mechanical power.

According to another exemplary embodiment, an electric traction vehicle includes a vehicle platform and a principal power unit mounted on the vehicle platform and comprising an engine and an AC generator coupled to the engine. The electric traction vehicle also includes an AC electric motor coupled to at least one wheel and supported relative to the vehicle platform, a drive controller coupled to the AC electric motor, a vehicle controller coupled to the drive controller, and an AC bus assembly to couple the principal power unit and the drive controller. The principal power unit is configured to receive power regenerated onto the AC bus assembly by the AC electric motor and to dissipate the power using the engine in order to provide a braking function.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION

Before turning to the FIGURES which illustrate the exemplary embodiments in detail, it should be understood that the invention is not limited to the details or methodology set forth in the following description or illustrated in the FIGURES. The invention is capable of other embodiments or being practiced or carried out in various ways. It should also be understood that the phraseology and terminology employed herein is for the purpose of description only and should not be regarded as limiting.

In general, the system and method described herein for providing braking capability in an electric vehicle includes the use of a combination of an engine and a generator to provide additional braking capability and to dissipate excess energy during regenerative braking. Power is dissipated through the engine and generator by configuring the generator to operate as a motor (i.e., "motoring" the generator) such that the flow of electrical power from the generator is reversed and the generator provides mechanical torque to the engine, which engine functions as an air compressor in the manner of a conventional engine brake or "jake brake." Using the combination of the engine and generator to provide additional braking capability may reduce wear on a mechanical braking system used in combination with regenerative braking, thereby reducing the cost associated with maintaining the mechanical braking system. Using the combination of the engine and generator to dissipate excess regenerated energy during regenerative braking may reduce the size of or eliminate the need for an additional energy dissipation device, thereby reducing the costs associated with additional energy dissipation systems.

Figure 1:
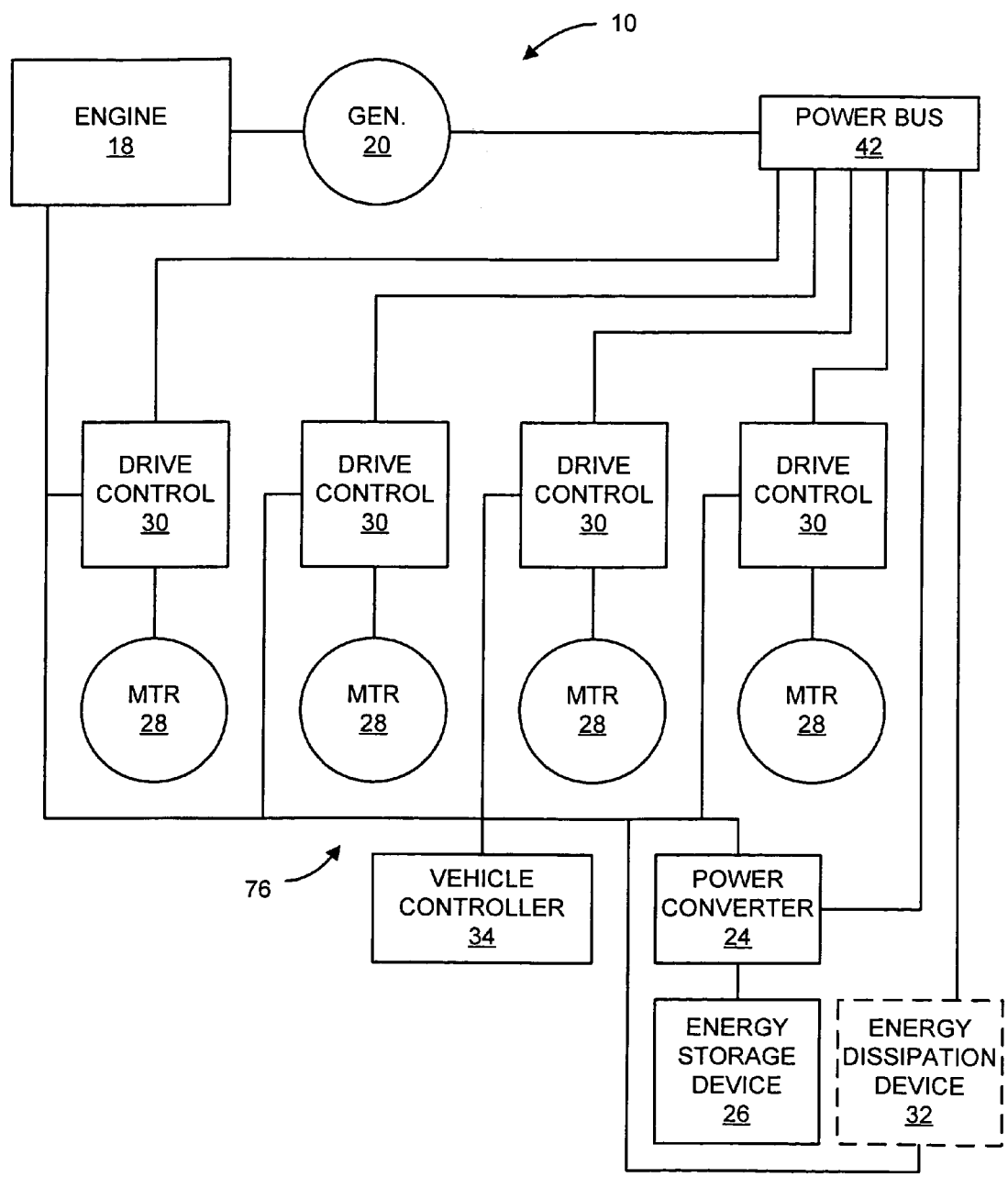
FIG. 1 is a schematic diagram of an electric traction vehicle according to an exemplary embodiment.

FIG. 1 is a schematic diagram of an electric traction vehicle 10 according to an exemplary embodiment. An electric traction vehicle is a vehicle that uses electricity in some form or another to provide all or part of the propulsion power of the vehicle. This electricity can come from a variety of sources, such as stored energy devices relying on chemical conversions (batteries), stored electrical charge devices (capacitors), stored energy devices relying on mechanical stored energy (e.g. flywheels, pressure accumulators), and energy conversion products. A hybrid electric vehicle is an electric traction vehicle that uses more than one sources of energy, such as one of the electrical energy storage devices mentioned above and another source, such as an internal combustion engine. By having more than one source of energy some optimizations in the design can allow for more efficient power production, thus one can use power from different sources to come up with a more efficient system for traction. The electric traction vehicle 10 can be used to implement electric vehicles in general and/or hybrid electric vehicles in particular. The electric traction vehicle 10 can implement a number of different vehicle types, such as a fire-fighting vehicle, military vehicle, snow blower vehicle, refuse handling vehicle, concrete mixing vehicle, etc.

In the illustrated embodiment, the electric traction vehicle 10 includes an engine 18, a generator 20, an electric power converter 24, an energy storage device 26, a plurality of electric motors 28, a plurality of drive controllers 30, a vehicle controller 34. Electric traction vehicle 10 optionally includes an energy dissipation unit 32. The generator 20, the drive controllers 30, and the electric power converter 24 are interconnected by a power bus 42, such as an AC or DC power bus. Electric traction vehicle 10 is generally configured to use a combination of the engine 18 and the generator 20 to provide braking capability and to dissipate excess electrical power generated by the electric motors 28 during regenerative braking.

The engine 18 is preferably an internal combustion engine, such as a diesel engine configured to both provide mechanical power to the generator 20 and to receive mechanical power from generator such that may function as a mechanical engine brake or air compressor. The generator 120 is coupled to the engine 18 and may be configured to function as both generator configured to provide AC or DC power, and as a motor configured to receive electrical power and provide mechanical power to the engine 18.

The electric power converter 24 is coupled to the energy storage device 26 and is configured to convert the electrical power generated by the generator 20, or by the electric motors 28 during regenerative braking, to the energy mode required by the energy storage device 26. For example, according to an exemplary embodiment, the electric power converter is configured to convert AC power generated by the generator 20 to DC power and transfer such converted power to the storage device 26. The electric power converter 24 may also convert the energy stored in the energy storage device 26 back to the energy mode of generator 20 to augment and supplement the power generated by generator 20 over the power bus 42. The energy storage device 26 may be electric capacitors, electrochemical capacitors or "ultracapacitors," storage batteries, a flywheel, or hydraulic accumulators.

The electric motors 28 are appropriately sized electric traction motors, which may be AC or DC electric motors. The electric motors 28 are configured to receive electrical power from the power bus 42 in order to provide a mechanical energy output to a wheel or axle. The electric motors 28 are also configured to receive mechanical energy from the wheel or axle during regenerative braking in order to generate electrical power onto the power bus 42.

The drive controllers 30 are coupled to each electric motor 28 and are configured to control the operation of each electric motor 28. More specifically, the drive controllers are configured to allow the electric motors 28 to either receive electrical power from the power bus 42 in order to provide a mechanical energy output to a wheel or axle, or to receive mechanical energy from the wheel or axle during regenerative braking in order to generate electrical power onto the power bus 42.

The vehicle controller 34 is coupled to the engine 18, the generator 20, the electric power converter 24, and the drive controllers 30 via a data bus network 76. The vehicle controller 34 is generally configured to control the operation of the engine 18, the generator 20, the electric power converter 24, the energy storage device 26, the plurality of electric motors 28, and the plurality of drive controllers 30. More specifically, the vehicle controller 34 is configured to assist in controlling the distribution of electrical power on the power bus so that the flow of electrical power from generator 20 and engine 18 may be reversed to provide braking capability, and so that excess electrical power generated by the electric motors 28 during regenerative braking is routed back to the generator 20 so that it may be dissipated through engine 18.

The optional energy dissipation unit 32 is typically a resistive element through which electrical power generated by the electric motors 28 during regenerative braking is dissipated as heat if the electrical power exceeds the capacity of the energy storage device 26. Preferably, electric traction vehicle 10 is configured such that the excess electrical power generated by the electric motors 28 during regenerative braking is sufficiently dissipated through engine 18 and generator 20.

According to an exemplary embodiment, in order to retard or slow the forward motion of the electric traction vehicle 10, the vehicle controller 34 provides signals to the engine 18, the generator 20, and the drive controllers 30 so that generator 20 switches from receiving mechanical power from the engine 18 and providing electrical power onto the power bus 42 (i.e., functioning as a generator) to receiving electrical power from the power bus 42 and providing mechanical power to the engine 18 (i.e., functioning as a motor). The electric motors 28 switch from functioning as motors to functioning as generators, and instead of providing a mechanical torque output, each of the electric motors 28 now receives mechanical energy from the rotation of, for example, a wheel set or axle coupled to the electric motor 28. The electric motors 28 now convert the mechanical energy to electrical energy and provide an electrical power output onto the power bus 42. The fuel supply to the engine 18 is shut off during braking, and the engine switches from providing mechanical power to the generator 20 to receiving mechanical power from the generator 20 such that it now functions as a mechanical engine brake or air compressor in order to dissipate the received mechanical power (e.g., as heat). According to an exemplary embodiment, electric traction vehicle 10 is configured to utilize an engine braking user interface such as those used for conventional mechanical engine braking or "jake brake" systems in conjunction with vehicle controller 34. According to another exemplary embodiment, the user interface allows the user to adjust the amount of power that can be dissipated through the engine 18 when it is used to provide braking.

During normal regenerative braking, vehicle controller 34 provides each of the drive controllers 30 with a positive speed reference signal and a negative torque reference signal such that the direction of flow of electric power to the electric motors 28 is reversed. The electric motors 28 switch from functioning as motors to functioning as generators, and instead of providing a mechanical torque output, each of the electric motors 28 now receives mechanical energy from the rotation of, for example, a wheel set or axle coupled to the electric motor 28. The electric motors 28 now convert the mechanical energy to electrical energy and provide an electrical power output onto the power bus 42.

The electrical power provided by the electric motors 28 onto the power bus 42 is diverted to the energy storage device 26. If the diverted electrical power exceeds the capacity of the energy storage device 26, the excess electrical energy is diverted to the generator 20. The generator 20 switches from receiving mechanical power from the engine 18 and providing electrical power onto the power bus 42 (i.e., functioning as a generator) to receiving electrical power from the power bus 42 and providing mechanical power to the engine 18 (i.e., functioning as a motor). The fuel supply to the engine 18 is shut off during braking, and the engine switches from providing mechanical power to the generator 20 to receiving mechanical power from the generator 20 such that it now functions as a mechanical engine brake or air compressor in order to dissipate the received mechanical power (e.g., as heat).

Figure 2:
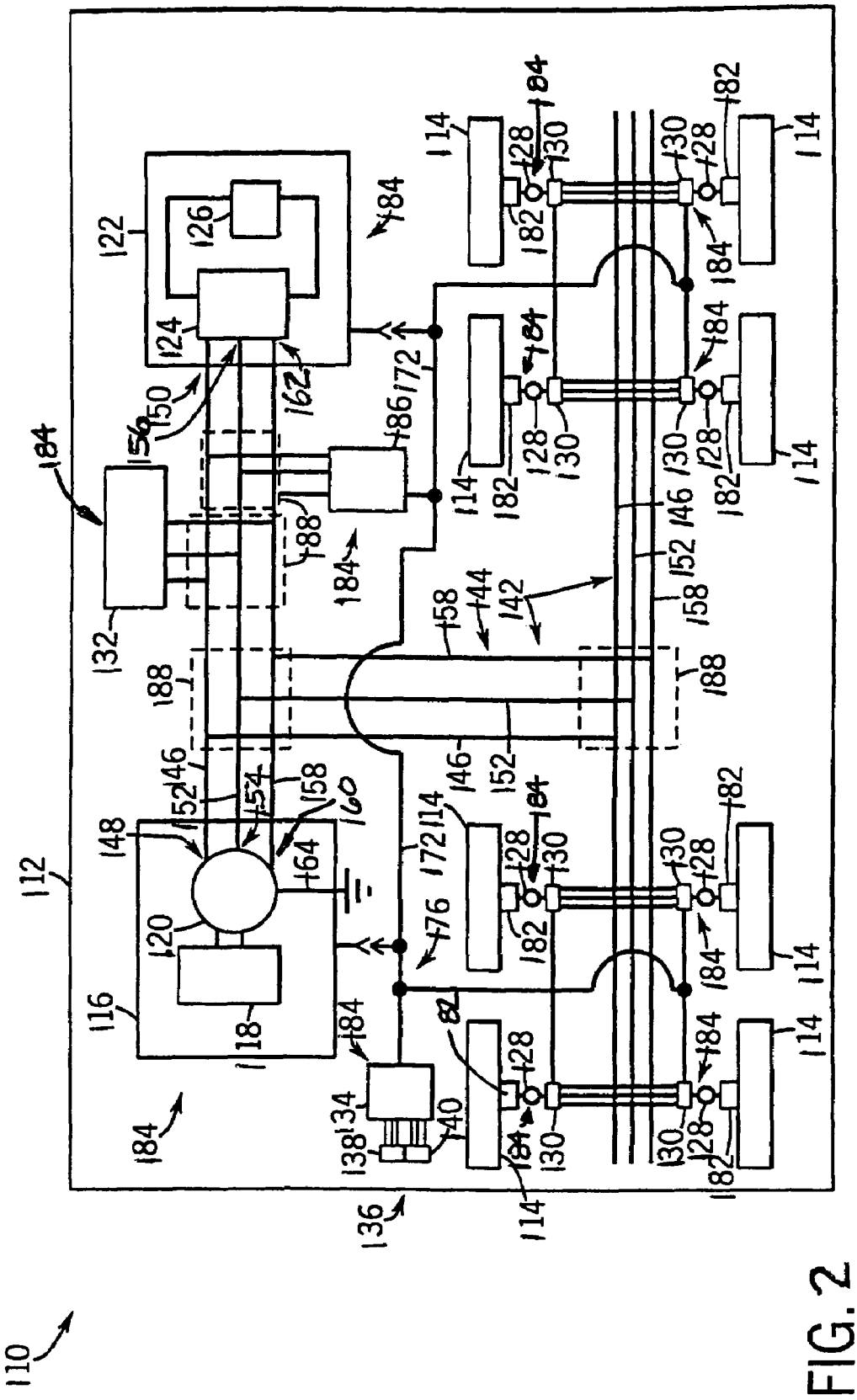
FIG. 2 is a schematic diagram of an exemplary embodiment of an electric traction vehicle providing an exemplary embodiment of an AC bus assembly coupled to various modules on the vehicle.

According to an exemplary embodiment, the system and method for providing braking capability in an electric vehicle is implemented in an electric traction vehicle that utilizes an AC bus assembly to distribute excess AC electrical power to and from AC electric motors and an AC generator coupled to an engine. FIG. 2 is a schematic diagram illustrating an electric traction vehicle 110 which is an embodiment electric traction vehicle 10 that utilizes an AC bus assembly coupled to various modules on the vehicle. In the illustrated embodiment, electric traction vehicle 110 includes a vehicle platform or vehicle support structure 112 upon which various modules 184 are removably mounted. Such modules 184 include a principal power unit 116, a power storage unit 122, an electric motor 128 coupled to at least one wheel 114 of the vehicle 110, a drive controller 130 coupled to the electric motor 128, and a vehicle controller 134 having a user interface 136. Additional modules 184, generally referred to as auxiliary modules 186, can be added to the electric traction vehicle 110 as circumstances and the situation warrants. For example, electric traction vehicle 110 may optionally include an energy dissipation unit 132.

Interconnecting the modules 184 on the electric traction vehicle 110 is an AC power bus assembly 142 and a data bus network 176 through which the vehicle and its various functions are controlled and operated. Specific descriptions of the various modules 184 and their functions will be provided hereinafter.

One embodiment of electric traction vehicle 110 comprises the vehicle platform 112 with a principal power unit 116 mounted on the vehicle platform 112. A power storage unit is mounted on the vehicle platform with a plurality of wheels, rotatably mounted on the vehicle platform 112 with an electric motor 128 coupled to at least one wheel 114. A drive controller 130 is coupled to the electric motor 128. A vehicle controller 134 having an input terminal 138 and an output terminal 140 is coupled to the drive controller 130 and the data bus network 176. The vehicle controller 134 receives data input from monitors and sensors, as well as from the operator input terminal 138, concerning the speed and power required for operation of electric traction vehicle 110. The torque output of each motor 128 is adjusted to meet the requirements established in the vehicle controller 134 from such data input. Coupling the principal power unit 116, the power storage unit 122, and the electric motor 128 through the drive controller 130 is an AC bus assembly 142. In some instances, the vehicle controller 134 is coupled to one of the principal power units 116 and the power storage unit 122 as determined by an operator of the electronic traction vehicle 110. A continuous track, supported by the wheels 114 can also be provided.

The electric traction vehicle 110 can be configured with one or more modules 184 consisting of modular independent coil spring suspensions for steerable and non-steerable wheel assemblies and driven and non-driven axles. Details of such modular independent coil spring suspensions can be found in U.S. Pat. Nos. 5,538,274, 5,820,150 and 6,105,984, which are hereby incorporated by reference, and which are assigned to the assignee of the present invention.

The principal power unit 116 includes a prime mover or engine 118 coupled to a generator or alternator 120. The prime mover 118 is preferably an internal combustion engine, such as a diesel engine configured to function as a mechanical engine brake. The generator or alternator 120 is coupled to the prime mover and preferably is a synchronous generator producing 460 to 480 volts, three phase, AC 60 hertz power for the electric traction vehicle 110. However, it is contemplated that different sized generators or alternators can be coupled to the prime mover for purposes of generating either higher or lower electrical power. For instance, a single phase system can be utilized, or a system that generates 720 volts can be used, or a system that operates at a frequency other than 60 hertz, such as 50 hertz, which is typical in European countries. It is also contemplated that the power generated by the principal power unit 116 can be modified by appropriate auxiliary modules 186, such as a step-down transformer to provide power to operate ancillary equipment on or associated with the electric traction vehicle 110, such as pumps, instruments, tools, lights and other equipment.

Various embodiments of the electric traction vehicle 100 are based on the number of wheels 114 that are driven on the electric traction vehicle 110. For instance, an embodiment includes an electric motor 128 and drive controller 130 coupled to another wheel 114 and coupled to the data bus network 176 and the AC bus assembly 142. The electric traction vehicle 110 can also include four electric motors 128 and four drive controllers 130 which are coupled to four wheels 114 and coupled to the data bus network 176 and the AC bus assembly 142. As shown in FIG. 2, eight electric motors 128 and electric drive controllers 130 can be coupled to eight separate wheels 114 and coupled to the data bus network 176 and the AC bus assembly 142. In all variants of the electronic traction vehicle 110, at least two of the wheels 114 are steerable.

The AC bus assembly 142 includes a plurality of phase conductors 144. A conductor 146 having an end 148 and an end 150 together with a conductor 152 having an end 154 and an end 156 can be configured together with a neutral 164 to provide single phase power in one embodiment of the electric traction vehicle 110. A conductor 158 having an end 160 and an end 162 can be used in conjunction with the conductor 146 and the conductor 152 to provide three phase power as shown in FIG. 2. The conductors 144 can be stranded metal wire such as copper or aluminum sized and clad to transmit the power generation contemplated in the design of electric traction vehicle 110. The conductors 144 can also be solid metal bars, generally referred to as bus bars, composed of appropriately clad metals, such as copper or aluminum, as will be appreciated by one ordinarily skilled in the art.

The electric motor 128 can be an appropriately sized traction motor. According to an exemplary embodiment, electric traction vehicle 110 includes an AC, three phase induction electric motor. Preferably, electric motor 128 has a simple cast rotor, machine mount stator, sealed ball bearings, and no brushes, internal switches or sliding contact devices, such that the rotor as the only moving part of the electric motor 128. Control of the electric motor 128 is achieved through a drive controller 130 which is coupled to the electric motor 128. According to an exemplary embodiment, the drive controller is an inverter, such as an AC-to-AC inverter. The torque output of the electric motor 128 is adjusted based on the rotational speed and power requirements established by the operator at the vehicle controller 134 and transmitted to the drive controller 130 over the data bus network 176. The drive controller 130 is coupled by a data bus 172 into the data bus network 176, which is connected to the vehicle controller 134. Signals generated by the vehicle controller 134, the drive controller 130, and other modules and sensors including auxiliary modules 186 are processed by the vehicle controller 134 with appropriate inputs and outputs provided by the user interface 136. It is also contemplated that wireless communication between the vehicle controller 134 and the various modules 184 can be achieved including communication of signals via radio waves, microwaves, and fiber optical paths including relay via satellite to a central command center.

Figure 3:
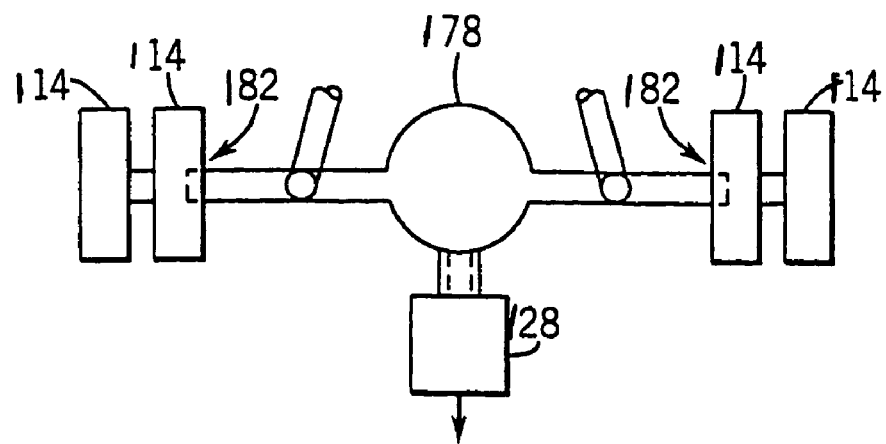
FIG. 3 is a top plan view illustration of an exemplary embodiment of a differential assembly coupled to an electric motor for driving at least two wheels and supported by a suspension assembly.
Figure 4:
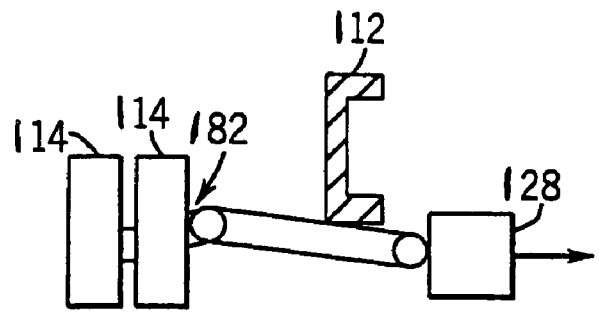
FIG. 4 is an end view partial sectional view of an exemplary embodiment of an electric traction vehicle support structure coupled to a suspension assembly which suspends at least one wheel relative to the vehicle support structure.

FIGS. 2 and 4 illustrate the wheels 114 being driven directly by an electric motor 128 through an appropriate wheel-end reduction assembly 182 if necessary. As shown in FIG. 3, a wheel-end reduction assembly 182 can also couple the wheels 114 to a differential assembly 178 via drive shafts. A plurality of wheel-end reduction assemblies 182 can couple the wheels 114 to their respective electric motors 128. Another embodiment of the vehicle 110 includes a differential assembly 178 coupled to the electric motor 128 for driving at least two wheels 114 as shown in FIG. 3. Additional differential assemblies 178, such as three assemblies 178, with each differential assembly coupled to an electric motor 128 for driving at least two wheels, can also be included in the electric traction vehicle 110.

As mentioned above, the electric traction vehicle 110 can be provided with the principal power unit 116, the power storage unit 122, the electric motor 128, the drive controller 130, the vehicle controller 134, the suspension assemblies and other associated equipment as modules 184 that may be removably mounted on the vehicle platform. The modules 184 are also removably connected to the data bus network 176 and the AC bus assembly 142. An auxiliary module 186 can be any type of equipment or tool required or associated with the function and operation of the electric traction vehicle 110. For example, the auxiliary module can be a pump, a saw, a drill, a light, etc. The auxiliary module 186 is removably connected to the data bus network 176 and the AC bus assembly 142. A junction 188 is used to facilitate the connection of the modules to the data bus network 176 and the AC power bus assembly 142 and are located at convenient locations throughout the vehicle 110. The junctions 188 can accommodate various types of connections such as quick connectors, nuts and bolts, solder terminals, or clip terminals or the like. The junction 188 can accommodate the data bus 172 or the phase conductor 144 or both.

Also connected to the AC power bus assembly 142 is the power storage unit 122. The power storage unit 122 includes an electric power converter 124 and an energy storage device 126. The energy storage unit 122 can be configured to provide electric power above and beyond that required of the principal power unit 116. The energy storage device 126 can be electric capacitors, electrochemical capacitors or "ultracapacitors," storage batteries, a flywheel, or hydraulic accumulators. The electric power converter 124 can be configured to convert the AC power generated by the principal power unit 116 to DC power and transfer such converted power to an appropriate storage device. The electric power converter 124 can also convert the energy stored in the energy storage device 126 back to AC power to augment and supplement the AC power generated by the principal power unit 116 over the AC power bus assembly 142. Applicants have determined that an additional 200-300 horse power of short-term power can be provided into the AC power bus assembly 142 over the phase conductors 144 by discharge of an on-board battery pack (energy storage device 126) under control of the power storage unit 122. The power storage unit 122 may be coupled to the data bus network 176 and controlled by the vehicle controller 134. The combined electrical power from the principal power unit 116 and the power storage unit 122 will all be available on the AC power bus assembly 142 for use by the electric motors 128 or by any other module 184 or auxiliary module 186 as determined by the operator at the user interface 136 of the vehicle controller 134.

In operation, the power storage unit 122 receives power from the principal power unit 116 over conductors 144 of the AC power bus assembly 142. The power received is converted into the appropriate energy mode required by the energy storage device 126 and maintained in the energy storage device 126 until required during the operation of the electric traction vehicle 110. If the principal power unit 116 is not functioning for any reason, the energy in the power storage unit can be utilized to operate, for a given period of time, the electric traction vehicle 110 or any of the modules 184 or auxiliary modules 186 mounted on the electric traction vehicle 110.

Energy storage recharge of the power storage unit 122 by the principal power unit 116 will begin automatically and immediately after the vehicle 110 arrives at its destination and will continue during the vehicle's return run to its original location. The state of charge of the power storage unit 122 will be maintained between missions by a simple plug connection to a power receptacle in the vehicle's garage or storage location, which receptacle will automatically disconnect as the electric traction vehicle 110 leaves such site. The power storage unit 122 can also receive energy generated by the electric motors 128 when the electric motors 128 are configured in a regeneration mode in which case they will function as a generator. Such functionality is utilized in a braking procedure for the vehicle as determined by the operator at the user interface 136 of the vehicle controller 134. The electric motor 128 and AC power bus assembly 142 are also be configured to regenerate power back to the principal power unit 116 to provide braking capability as described above with reference to FIG. 1. Preferably, vehicle controller 134 and drive controllers 130 are configured to regulate the power factor on AC bus assembly during regeneration.

An additional module 184 that may be provided in another embodiment of the vehicle 110 is an energy dissipation unit 132 coupled to the AC bus assembly 42 and the data bus network 176. If it is determined that the principal power unit 116 or the electric motors 128 or any other auxiliary module 186 generating too much power or are not utilizing sufficient power, the excess power can be dissipated through the energy dissipation device 132. An example of an energy dissipation device 132 is a resistive coil that may be additionally cooled by fans or an appropriate fluid. Another example of an energy dissipation unit 132 is a steam generator which utilizes excess heat generated in the vehicle to heat water to produce steam. Preferably, energy dissipation device 132 is replaced or supplemented by configuring the generator or alternator 120 to function as a motor and using the engine 118 as an air pump or compressor to dissipate the excess power as described above with reference to FIG. 1.

The foregoing description of embodiments has been presented for purposes of illustration and description. It is not intended to be exhaustive or to be limited to the precise forms disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto and their equivalents.

What is claimed is:

1. An electric traction system for an electric vehicle comprising:
    an internal combustion engine and a generator coupled to the engine;
    a power bus coupled to the generator;
    a power storage unit coupled to the power bus;
    a drive controller coupled to an electric motor and to the power bus; and
    a vehicle controller coupled to the drive controller;
    wherein the generator is configured to receive electrical power regenerated onto the power bus by the electric motor in order to provide mechanical power to the engine, and the engine is configured to dissipate the mechanical power in order to provide a braking function.

2. The electric traction system of claim 1, wherein the engine is configured to function as an air compressor in order to dissipate the mechanical power.

3. The electric traction system of claim 1, wherein the power storage unit is configured to store electrical power regenerated onto the power bus by the electric motor.

4. The electric traction system of claim 3, wherein the power storage unit is configured to store a first amount of the electrical power regenerated onto the power bus by the electric motor, and the generator is configured to receive a second amount of the power regenerated onto the power bus by the electric motor.

5. The electric traction system of claim 3, wherein the power storage unit comprises at least one capacitor.

6. The electric traction system of claim 1, wherein the engine is a diesel engine.

7. The electric traction vehicle of claim 1, wherein the generator is an AC synchronous generator.

8. The electric traction system of claim 1, wherein the electric traction system is configured for use with a series hybrid vehicle.

9. The electric traction system of claim 1, wherein the drive controller is an AC-to-AC inverter.

10. The electric traction system of claim 1, wherein the electric motor is an AC motor.

11. A method of providing braking in an electric vehicle comprising:
    providing an internal combustion engine and a generator coupled to the engine;
    providing a power bus coupled to the generator;
    providing a power storage unit coupled to the power bus;
    providing a drive controller coupled to an electric motor and to the power bus;

providing a vehicle controller coupled to the drive controller;

configuring the generator to receive electrical power regenerated onto the power bus by the electric motor in order to provide mechanical power to the engine; and configuring the engine to dissipate the mechanical power.

12. The method of claim 11, wherein configuring the engine to dissipate the mechanical power comprises configuring the engine to function as an air compressor.

13. The method of claim 11, further comprising configuring the power storage unit to store electrical power regenerated onto the power bus by the electric motor.

14. The method of claim 13, further comprising configuring the power storage unit to store a first amount of the electrical power regenerated onto the power bus by the electric motor, and configuring the generator to receive a second amount of the power regenerated onto the power bus by the electric motor.

15. The method of claim 13, wherein providing the power storage unit comprises providing at least one capacitor.

16. The method of claim 11, wherein the providing the engine comprises providing a diesel engine.

17. The method of claim 11, wherein the providing the generator comprises providing an AC synchronous generator.

18. The method of claim 11, further comprising configuring the electric traction system for use with a series hybrid vehicle.

19. The method of claim 11, wherein the providing the drive controller comprises providing an AC-to-AC inverter.

20. The method of claim 11, wherein the providing the electric motor comprises providing an AC electric motor.

21. An electric traction vehicle comprising:
a vehicle platform;
a principal power unit mounted on the vehicle platform and comprising an engine and an AC generator coupled to the engine;
an AC electric motor coupled to at least one wheel and supported relative to the vehicle platform;
a drive controller coupled to the AC electric motor;
a vehicle controller coupled to the drive controller; and
an AC bus assembly to couple the principal power unit and the drive controller;
wherein the principal power unit is configured to receive power regenerated onto the AC bus assembly by the AC electric motor and to dissipate the power using the engine in order to provide a braking function.

22. The electric traction vehicle of claim 21, wherein the AC generator is configured to receive AC power regenerated onto the AC bus assembly by the AC electric motor in order to provide mechanical power to the engine.

23. The electric traction vehicle of claim 21, wherein the engine is configured to function as an air compressor in order to dissipate the power.

24. The electric traction vehicle of claim 21, further comprising a power storage unit configured to store AC power regenerated onto the AC bus assembly by the AC electric motor.

25. The electric traction vehicle of claim 24, wherein the power storage unit is configured to store a first amount of the AC power regenerated onto the AC bus assembly by the AC electric motor, and the principal power unit is configured to dissipate a second amount of the AC power regenerated onto the AC bus assembly by the AC electric motor.

26. The electric traction vehicle of claim 24, wherein the power storage unit comprises at least one capacitor.

27. The electric traction vehicle of claim 21, wherein the engine is a diesel engine.

28. The electric traction vehicle of claim 21, wherein the AC generator is a synchronous generator.

29. The electric traction vehicle of claim 21, wherein the electric traction vehicle is configured as a series hybrid vehicle.

30. The electric traction vehicle of claim 21, wherein the drive controller is an AC-to-AC inverter.

* * * * *